United States Patent [19]

Chu et al.

[11] 3,873,514

[45] Mar. 25, 1975

[54] PREPARATION OF GEL FOR AFFINITY CHROMATOGRAPHY

[75] Inventors: Albert E. Y. Chu, El Cerrito; Christopher J. Siebert, Berkeley, both of Calif.

[73] Assignee: Bio-Rad Laboratories, Richmond, Calif.

[22] Filed: May 17, 1974

[21] Appl. No.: 470,775

[52] U.S. Cl............. 260/209.6, 106/208, 195/100, 204/180, 210/31, 252/316, 252/408
[51] Int. Cl............................................. C08b 25/00
[58] Field of Search............................... 260/209.6

[56] References Cited
UNITED STATES PATENTS

| 2,881,161 | 4/1959 | Köhler et al. | 260/209.6 |
| 3,281,409 | 10/1966 | Blethen | 260/209.6 |
| 3,527,712 | 9/1970 | Renn et al. | 204/180 |

OTHER PUBLICATIONS

Chemical Abstracts, Volume 69, 1968, page 19482e.
Chemical Abstracts, Volume 72, No. 11, March 16, 1970, page 51590m.
Chemical Abstracts, Volume 78, No. 20, May 21, 1973, page 126095p.
Noller, Chemistry of Organic Compounds, 3rd Edition, Saunders Company, Philadelphia, Pa., 1965, page 432.

Primary Examiner—Ronald W. Griffin

[57] ABSTRACT

Improved functionalized agarose beads are provided which find use in affinity chromatography. The agarose beads are first cross-linked with a polyfunctional compound under mild conditions, followed by reacting with a haloalkylcarboxy compound or, alternatively, a haloalkylamine compound followed by amide formation with a cyclic carboxylic acid anhydride, to provide a final product having an ether linkage and a carboxy functionality for linking to other compounds.

The resulting agarose beads have improved flow and packing characteristics and improved chemical and physical stability, while providing a stable functionality for linking to a wide variety of compounds.

11 Claims, No Drawings

PREPARATION OF GEL FOR AFFINITY CHROMATOGRAPHY

BACKGROUND OF THE INVENTION

1. Field of the Invention

Affinity chromatography has become an increasingly valuable tool for research and commercial applications involving biological materials. In affinity chromatography, an insoluble phase is employed, which acts as a stationary phase during the chromatography. Various molecules can be bonded to the stationary phase, for which other molecules have some degree of binding specificity or binding constant. By preparing a column of the insoluble phase, one can separate materials having some binding affinity for the compounds bound to the insoluble phase from other materials in the mixture.

For example, one can bind a ligand, hapten or antigen, to an insoluble phase such as agarose beads. By passing serum having antibodies to the ligand through the column, the antibodies which bind to the ligand will be preferentially bound to the insoluble phase. The antibodies may then be isolated by passing a solution through the column which reduces the binding affinity of the antibodies for the ligand. Obviously, the process can be reversed, where antibodies are bound to the insoluble phase, and haptens or antigens separated and isolated. Affinity chromatography has also been used for purifying enzymes, proteins having specific binding properties, nucleic acids, as well as other compounds or compositions which provide some preferential binding for another compound, e.g., thyroid binding globulin.

The criteria for the insoluble phase or stationary phase are manifold. The insoluble phase should interact very weakly with the materials of interest, particularly proteins, so as to minimize nonspecific adsorption. The insoluble phase should also exhibit good flow properties, which must be retained after the insoluble phase has been conjugated with a particular ligand. There must be chemical groups that can be activated or modified under conditions which are innocuous to the structure of the matrix. These functionalities should be abundant in order to allow for attainment of a high effective concentration of coupled inhibitor. In this manner, satisfactory adsorption can be achieved even with systems of low affinity or low binding constants.

The insoluble phase should be mechanically and chemically stable not only to the conditions of coupling, but also to the conditions of adsorption and desorption, which may well include denaturants, such as urea, guanidine hydrochloride, and detergents. Also, the insoluble phase should form a very loose, porous network that permits uniform and unimpaired entry and exit of large macromolecules throughout the entire matrix. Desirably, the insoluble phase should consist of uniform, spherical and rigid particles.

Among the more popular materials employed today as the insoluble phase for affinity chromatography is agarose. However, agarose, has less than ideal flow and packing characteristics and does lose its structure under a variety of conditions after relatively short times. In addition, agarose is subject to physical changes, such as shrinking, upon treatment with a number of different reagents. It is, therefore, desirable to improvve the properties of agarose, to enhance its lifetime and use for affinity chromatography.

2. Description of the Prior Art

An excellent survey of affinity chromatography may be found in article by Cuatrecasas, Advances in Enzymology, 36, 29 (1972). See also Stark, G. R., ed. "Biochemical Aspects of Reactions on Solid Supports," Academic Press (1971), Cuatrecasas, et al., Annu. Rev. Biochem., 40, 259 (1971), and Friedberg, Chromatogr. Rev., 14, 121 (1971). And also, Cuatrecasas, P. and Parikh, I., Biochemistry, 11, 2291 (1972).

SUMMARY OF THE INVENTION

Novel agarose beads for affinity chromatography are provided by cross-linking agarose with 1,3-dihalo-2-hydroxypropane, followed by reacting the cross-linked agarose with an aliphatic halogen compound to form an ether and having a functionality which may be further functionalized for linking to a wide variety of ligands or has a functionality for linking to a wide variety of ligands.

Specifically, haloamines or halocarboxyamides are employed for forming the ether linkage, the amaines being further functionalized, if desired, employing a cyclic anhydride group.

DESCRIPTION OF THE SPECIFIC EMBODIMENTS

Novel agarose beads and a method for their preparation are provided having enhanced physical and chemical properties for use in affinity chromatography. The beads are first cross-linked employing a 1,3-dihalo-2-propanol, wherein the halogens are of atomic number 17 to 35, to provide a cross-linked agarose with improved physical stability, as well as, improved flow and packing characteristics. The resulting cross-linked agarose is then functionalized with an aliphatic aminohalide or carboxyamidohalide to form an ethereal linkage with the agarose. The amino group may be further functionalized by reaction with cyclic anhydrides. The carboxy groups can be employed to couple a suitable compound having alcoholic functionality, such as N-hydroxy succinimide, by activation with carbodiimide or other condensing reagent. The resulting active ester is then useful for reaction with amino groups of ligands.

The first step in the preparation of the modified agarose is cross-linking. Commercially available agarose can be employed. Particle sizes will generally vary from about 15 mesh to 500 mesh, more usually from about 100 to 300 mesh. The exclusion limit will generally vary from about 1 million to 50 million Daltons or greater, more usually from about 5 million to 50 million Daltons. The agarose is commercially available as Bio-Gel A, Sepharose, and the like. The beads are normally supplied in an aqueous medium having from about 0.5 to 10, usually 0.5 to 5 weight percent gel concentration. Throughout the method of the invention an aqueous medium will be employed. While water, particularly deionized water, will be the medium of choice, up to 100 volume percent of an inert polar solvent may be present, such as dioxane, ethylene glycol, dimethyl ether, hexamethyl phosphoramide, tetrahydrofuran, etc. The preferred organic solvents are ethereal solvents having from one to two carbon atoms.

As used in the subject invention, the agarose beads will generally be in an amount from about 0.5 to 10 weight percent, more usually from about 0.5 to 5 weight percent in an aqueous medium. The medium will have a basic pH, generally in the range of about 9 to 14, more usually in the range of about 11 to 13. The pH is readily achieved, by the addition of concentrated aqueous alkali metal base, conveniently sodium hydroxide in from about 3 to 10N, more usually about 3 to 8N.

The temperature at which the reaction is carried out is a mild temperature conveniently ambient, generally being in the range of about 15° to 35°C, more usually from about 20° to 30°C. The time for the reaction will vary widely, depending on the temperature, the amount of cross-linking agent, the degree of cross-linking desired, and the like. Usually, times for the reaction will vary from about 4 to 24 hours.

The dihalogenated n-alkanol is an $\alpha, \gamma$-dihalo-$\beta$-alkanol of from about 3 to 6 carbon atoms, preferably 3 carbon atoms, with a halo of from 17 to 35 atomic number (chloro and bromo), particularly chloro. The dihaloalkanol will be used in amounts of from 0.5 to 50 mmoles, usually 1 to 25 mmoles per gram of agarose. The haloalkanol will be added to the gel medium in amounts of from about 0.05 to 15, usually 0.5 to 10 weight percent of the total reaction mixture and the mixture maintained at the desired temperature for the time necessary to obtain the desired degree of cross-linking. The mixture is conveniently agitated, to insure substantially uniform distribution of the reactants in the reaction medium. After completion of the reaction, the beads are washed with deionized water to remove any unreacted haloalkanol and base, filtered, and then resuspended in deionized water to the desired concentration. The cross-linked beads are then ready for use in introducing reactive functionalities.

The resulting agarose beads are cross-linked with a 2-hydroxy-1,3-propylene group, there being from about 0.0005 to 0.5, more usually from about 0.001 to 0.1 mole of cross-linking per gram of agarose beads based.

The compound employed for introducing a reactive functionality will be either a haloalkylamine or an N-haloalkyl amic acid, where the acid is derived from a cyclic carboxylic anhydride. For the most part, these compounds will have the following formula:

$$X-R-N(H)Y$$

wherein:

X is halogen of atomic number 17 to 35;

R is alkylene of from 2 to 6 carbon atoms, more usually of from 3 to 4 carbon atoms, and preferably 3 carbon atoms;

Y is hydrogen or of the formula:

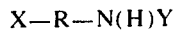

wherein:

Z is hydrocarbon of from 2 to 8 carbon atoms, more usually of from 2 to 6 carbon atoms and may be aliphatic, alicyclic, or aromatic, and Y is the acyl residue of a dicarboxylic acid capable of forming a cyclic anhydride ring of from 5 to 6 annular members, usually having from 0 to 1 site of ethylenic unsaturation and otherwise aliphatically saturated. Preferably, Z is aliphatic of from 2 to 4 carbon atoms, more usually of from 2 to 3 carbon atoms having from 0 to 1 site of ethylenic unsaturation. Illustrative dicarboxylic acids include succinic acid, glutaric acid, maleic acid, o-phthalic acid, 1,2-cyclohexane dicarboxylic acid, aconitic acid, and the lower alkyl, particularly methyl substituted derivatives thereof.

Where the haloamine is initially reacted with the cross-linked agarose, the amount of the halomine employed will be in the range of about 0.0005 to 12 mmoles per gram of agarose, more usually of from 0.001 to 0.5 mmoles per gram of agarose. The total concentration of the reactants will generally be from about 0.5 to 12 weight percent, usually 1 to 10 weight percent. These concentrations will normally be employed for the subsequent reactions.

A basic pH is maintained during the reaction, normally in the range of 9 to 14, preferably from about 11 to 13. Ambient temperatures can be employed, the temperature generally ranging from about 15° to 35°C, more usually from about 20° to 30°C. The time for the reaction will vary, depending upon the conditions, the degree of functionalizing desired, and the concentrations of the reactants, generally ranging from about 6 to 24 hours, more usually from about 8 to 18 hours. The pH is achieved in the same manner employed when cross-linking the agarose, namely by the addition of a strong alkali metal base, particularly of atomic number 3 to 19.

The haloalkylamine is usually added as its hydrohalide salt, so that it will be necessary to have sufficient base to react with the acid and still provide the desired pH. The reaction is easily carried out by employing an agarose bead gel having from about 0.5 to 10 weight percent, more usually from about 0.5 to 5 weight percent of solids in an aqueous medium. The haloalkylamine is added to the aqueous medium with agitation and the reaction allowed to proceed. After completion of the reaction, the solution is filtered, washed with deionized water, and may then be used for further reaction if desired.

While the amino group can be employed for conjugating to a wide variety of ligands, it is generally preferred to further functionalize the amino group by reacting the amino group with a cyclic anhydride. For the formation of the amic acid, the pH will normally be adjusted in the range of about 4.5–10, preferably from about 5.5–8.0, using a mineral acid, such as a hydrohalide acid, e.g. hydrochloric acid, of from about 1 to 6N, although the normality is a matter of convenience. The temperature will generally range from about 15° to 55°C, more usually from about 20° to 35°C, and preferably at about 25°C. The time for the reaction will generally be in the range of about 2 to 8 hours, more usually from about 3 to 6 hours.

The acid anhydride is of 5 to 6 annular members and of the formula:

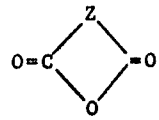

wherein:

Z has been defined previously.

The acid anhydride is generally added in stoichiometric amounts or greater, generally not exceeding 3 times stoichiometric and usually not exceeding 2 times stoichiometric. That is, per mole of amino group available, generally 0.9 to 3 moles, more usually from about 1.2 to 2 moles of the anhydride will be employed.

The reaction is carried out by adding the acid anhydride to the gel beads is deionized water adjusted to the appropriate pH and agitating the mixture, maintaining the pH by the addition of acid or base, as required. The product may then be filtered and washed with deionized water and is ready for further derivativization for conjugation.

Alternatively, the haloalkylamine may be first reacted with the cyclic anhydride and the resulting N-haloalkyl amic acid conjugated to the agarose beads. The haloalkyl amic acid is prepared by combining the haloalkylamine hydrochloride at a temperature in the range of about 15° to 50°C, preferably from about 20° to 30°C, and at a pH in the range of about 4.5 to 10, preferably from 5.5 to 8.0, with at least about a stoichiometric amount of acid anhydride, usually not exceeding about twice stoichiometric.

The time for the reaction will generally range from about 4 to 26 hours, with the two materials being stirred together in an aqueous medium. The anhydride is added incrementally while maintaining the desired pH with the addition of a strong aqueous mineral base. The mixture may then be filtered and is ready for use. The conditions for conjugating the haloalkyl amic acid to the agarose beads are the same as those set forth for conjugating the haloalkylamine. Conveniently, somewhat stronger alkali may be employed, usually not exceeding 12N, but the particular choice and concentration of alkali is primarily one of convenience, 5 to 10N sodium hydroxide being useful.

The product is an ether having the arm RN(H)Y, the symbols having been defined previously.

As desired, the gel beads may be filtered, washed and resuspended in an aqueous medium at from about 0.5 to 10 weight percent, or dried. Drying is achieved by washing, usually repeatedly, with a polar substantially anhydrous inert organic solvent, particularly an alkanol of from 1 to 4 carbon atoms, e.g. methanol, ethanol and isopropanol, and filtering using vacuum suction, until a water content below about 2 weight percent of the agarose beads is obtained. Each washing employs about 1 to 5 volume of solvent. Preferably, the agarose beads are then washed with anhydrous p-dioxane, usually 1 to 5 volumes, using filtration and milk vacuum suction to separate the solvents. The washing with the original solvent may then be repeated. The particular manner of drying the beads can be varied without critical change in the nature of the beads.

To further add to the versatility of the subject agarose beads, the carboxylic acid may be further derivatized to form a reactive ester. The reactive ester of choice is the ester of N-hydroxy succinimide. The resulting ester may then be directly used for conjugating with a wide variety of compounds having active amino groups, e.g., primarily and secondary amines such as are present in lysine, methamphetamine, arginine, or the like. Esters can also be formed.

The ester is conveniently formed by combining the carboxy conjugated agarose beads with the N-hydroxy succinimide in the presence of a carbodiimide, usually a water soluble carbodiimide. The anhydrous agarose beads are suspended in an inert polar solvent, e.g., p-dioxane, and a carbodiimide and N-hydroxy succinimide added with stirring, preferably incrementally, with from about 1 to 2 moles of carbodiimide, per mole of the N-hydroxy succinimide. The amount of N-hydroxy succinimide will generally be from about 1 to 2, more usually from about 1.5 times the stoichiometric required for complete esterification of the available carboxy groups. The reaction may be stirred at ambient temperatures, generally the temperature will range from about 15° to 35°C, for periods from 2 to 24 hours. The reaction may then be filtered, washed with methanol, conveniently by slurrying the agarose beads in the methanol and the beads allowed to settle. The supernatant liquid may be decanted and the beads washed with dioxane and then filtered. The beads are now ready for use for conjugation with a wide variety of compounds reactive with the N-hydroxy succinimide ester.

The esterified agarose beads will have arms of the following formula:

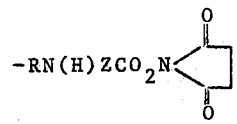

wherein:
the symbols have been defined previously.

EXPERIMENTAL

The following examples are offered by way of illustration and not by way of limitation. All temperatures not otherwise indicated are in Centigrade. All parts or percentages not otherwise indicated are by weight.

EXAMPLE I

To 100ml of agarose (particle size 100–200 mesh, 3% solids, supplied as BioGel A 15m, by Bio-Rad Laboratories) was added 100ml of deionized water, and the pH adjusted to 12.5–13 with 5N sodium hydroxide. With stirring, 1g of 1,3-dichloro-2-propanol was added and the solution stirred overnight at 25°C. At the end of this time, the beads were washed with 800ml of deionized water and filtered. The beads were then resuspended in deionized water to provide a final volume of 200ml.

To prepare N-(3-chloropropyl) succinamic acid, 6.5g (0.065 moles) of succinic anhydride is added incrementally to 6.5g (0.05 moles) of 3-chloropropylamine hydrochloride dissolved in 10ml deionized water. The addition of the succinic anhydride provides a supersaturated condition and sodium hydroxide is added to adjust the pH between 5.5 and 6 while continuously stirring the mixture. After stirring for a period of about 4 hours, the mixture is filtered to provide a final volume of 20ml.

The succinamic acid solution and the agarose bead suspension are combined with stirring and 10M sodium hydroxide added until the mixture reaches a pH 12.5 and the pH is maintained for a period of 30 minutes. The mixture is then stirred overnight at room temperature followed by filtration.

In drying the beads, 200ml of methanol is added initially, the mixture filtered and the methanol addition repeated twice with 100ml aliquots, followed each time by filtration. After this treatment, the water content should be less than about 2% as determined by the Karl Fischer method.

The beads are then washed with 3 volumes of anhydrous p-dioxane for a total of 3 times, removing the p-dioxane each time with mild vacuum suction through a filter plate.

To esterify the beads, the anhydrous agarose beads are suspended in 100ml p-dioxane with stirring. To the suspension is added 10g of EDAC (1-ethyl-3-(3'-dimethylaminopropyl)-carbodiimide and 10g of N-hydroxysuccinimide, the latter being added incrementally over a period of 10 minutes. The mixture is allowed to stir overnight, filtered, and the beads suspended in 100ml of methanol and stirred 15 minutes. After allowing the beads to settle, the supernatant is decanted, the residue washed with 100ml of dioxane and filtered.

The process was varied in a number of ways, to vary the amount of cross-linking, vary the degree of conjugation with a carboxy derivative, and vary the manner of esterification.

The degree of cross-linking was varied by employing with the same amount of agarose 0.5g or 10g of 1,3-dichloro-2-propanol and stirring the mixture at 35°C overnight.

To vary the degree of conjugation, the succinamide acid was formed by using correspondingly 1g of 3-chloropropylamine hydrochloride in 2ml deionized water with 1g of succinic anhydride or 10g of 3-chloropropylamine hydrochloride in 20ml of deionized water with 10g of succinic acid anhydride. Each of these were conjugated to the agarose in the same manner as when 6.5g of each of the two reactants was employed.

To prepare the ester, correspondingly 1g of EDAC and 1g of N-hydroxy succinimide was used with the 1g preparation and 10g of each of the reactants with the 10g preparation.

To determine the capacity of the agarose, a test to be described subsequently, is employed using radioactive alanine. Results are reported in $\mu$moles of alanine per gram (dry weight) of agarose based on $\mu$moles of alanine coupled.

The capacity for alanine for the 1g preparation, 6.5g preparation, and 10g preparation were 20, 340 and 500$\mu$mole alanine per gram.

The process steps were further varied by using a variety of different carbodiimides, with 10g of the substitute carbodiimide being employed in place of the 10g of EDAC. The carbodiimides employed were 1-cyclohexyl-3-(2'-morpholinoethyl)-carbodiimide metho-p-toluenesulfonate(CMC): N,N'-dicyclohexyl carbodiimide (DCC); and the functionally similar reagent, N-ethoxycarbonyl ethoxyl-1,2-dihydroquinoline(EEDQ). These carbodiimides were substituted for EDAC in the original preparation employing 6.5g each of the reactants involved in the formation of the succinamic acid. The capacities of the agarose for alanine for the original preparation and the preparations using the other carbodiimides are as follows:

EDAC-340$\mu$mole; CMC-72$\mu$mole; EEDQ-280$\mu$mole; DCC-405$\mu$mole alanine per gram.

EXAMPLE II

Employing cross-linked agarose beads prepared as described in Example I, 200ml of the agarose solution was adjusted to a pH 12.5–13 with 5N aqueous sodium hydroxide. A filtered solution of 6.5g of 3-chloropropylamine hydrochloride in 10ml deionized water is added to the agarose suspension with stirring and the pH maintained at 12.5. The solution was stirred overnight, filtered and washed with 1 liter of deionized water.

The agarose beads were resuspended in 100ml deionized water and the pH adjusted to 5.5–6 with 3N HCl. To the stirring suspension was added incrementally 6.5g of succinic anhydride with the pH being adjusted to the above indicated range by the addition of 5N aqueous sodium hydroxide. The solution was stirred at 25°C for about 4 hours, the mixture filtered, and the beads dehydrated as described in Example I. The product had a capacity of 360$\mu$moles alanine per gram.

EXAMPLE III

The drying procedure described in Example I was varied by employing 1 volume of anhydrous tetrahydrofuran in place of the 200ml of methanol and washing with anhydrous tetrahydrofuran after the initial wash p-dioxane. In the preparation of the ester, 100ml of anhydrous tetrahydrofuran was employed in place of the p-dioxane and the beads suspended in tetrahydrofuran, rather than in dioxane.

The following is a description of the method for determining the agarose capacity.

To a glass fiber filter (Reeve Angel, Grade 934AH, 2.4cm), pipet 25$\lambda$alanine solution. Dry the disc under an IR lamp and place it in a scintillation vial. Fill the vial with 5ml scintillation fluid (toluene). Obtain the CPM of the 25$\lambda$ sample from a scintillation counter. The CPM obtained represents 12.5$\mu$mole. By the following formula, the CPM per 500$\mu$mole of alanine sample is obtained.

$$(CPM/25\lambda alanine \times 40) = CPM/ml\ 500\mu mole\ alanine\ solution.$$

$$\dots C_o\ solution$$

To a 10ml test tube is added 1ml alanine solution and 20mg vacuum-dried agarose (15m). At the same time, to another 10ml test tube is added 1ml alanine solution and 20mg of the sample agarose. Both tubes are shaken at 4° for 2 to 4 hours. Transfer the contents of each tube to a filter unit of Hoefer filter device. Each unit contains a glass fiber filter disc. Wash the disc in the following sequence by gravitational filtration:

1. 3 volume distilled water
2. ½ volume 1M NaOH
3. 3 volume distilled water
4. ½ volume 1M HCl
5. 3 volume distilled water
6. 1 volume 1M NaCl
7. 3 volume distilled water Then withdraw most of the water on the disc by vacuum suction. Transfer the disc under an IR lamp to be dried. After 0.5 hour, the disc should be dried and is then placed in a scintillation vial filled with 5ml of scintillation fluid-toluene. Take both vials to be counted in scintillation counter. The true CPM of the alanine coupled to the sample agarose is found by:

$$CPM_{(Sample)} - CPM_{(Agarose)} = CPM\ alanine\ coupled\ to\ sample$$

$$\dots C_x$$

The $\mu$mole of alanine coupled to sample is $$= (500 \times (C_x/C_o))\ \mu mole$$

If the sample of weight $W_y$ is not completely dried, the dry weight should be determined by drying a sample of weight $W_y$ in a vacuum oven at 100° for 5 hours to give $W_x$ and the correct amount of alanine coupled determined by the following formula:

Alanine in μmole coupled per gm of sample=

$$(500 \times (C_x/ C_o) \times cW_y/W_x \times 50)$$

In accordance with the subject process and the agarose beads obtained thereby, the capacity for alanine can be widely varied. High capacities can be achieved without deterioration of flow and permeation characteristics. It is found that with the increased physical and chemical stability, the desirable gel permeation characteristics are retained and improved flow and packing characteristics are achieved. Improved rehydration and a higher packed bead volume is obtained. Furthermore, the groups conjugated to the agarose are found to have high chemical stability, so that a wide variety of compounds can be covalently linked to the agarose beads without significant loss during subsequent use and processing. The agarose beads are versatile tools for use in research and commerical purification, extractions, concentrations, and the like.

Although the foregoing invention has been described in some detail by way of illustration and example for purposes of clarity of understanding, it will be obvious that certain changes and modifications may be practiced within the scope of the appended claims.

What is claimed is:

1. A method for improving the physical and chemical characteristics of agarose beads while obtaining improved flow and packing properties comprising:
    a. combining in an aqueous medium under mild conditons at an alkaline pH agarose beads with 1,3-dihalopropanol-2, wherein halogen is of atomic number 17 to 35, in an amount of from about 0.5 to 50 mmole per gram of agarose, for a time sufficient to provide the desired degree of cross-linking; and
    b. washing the cross-linked agarose beads free of unreacted 1,3-dihalopropanol-2.

2. A method according to claim 1, wherein said halo is chloro and is present in from about 1 to 25 mmole per gram of agarose, said beads are present in said aqueous medium in from about 0.5 to 10 weight percent and said pH is in the range of 9 to 13.

3. A method according to claim 1, including the additional steps of:
    c. combining said cross-linked agarose beads in an aqueous medium at an alkaline pH under mild conditions with a compound of the formula:

$$X—R—N(H)Y$$

wherein:
    X is halogen of atomic number 17 to 35;
    R is alkylene of from 2 to 6 carbon atoms;
    Y is hydrogen or is an acyl residue of a dicarboxylic acid capable of forming a cyclic anhydride of from 5 to 6 annular members of the formula:

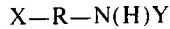

wherein:
    Z is hydrocarbon of from 2 to 8 carbon atoms;

for a time sufficient to conjugate said agarose beads with said compound with the formation of a plurality of ether linkages;
    with the proviso that when Y is hydrogen, said conjugated agarose beads are combined in an aqueous medium at a pH at or below 7 with an at least stoichiometric amount based on amino groups, of a compound of the formula:

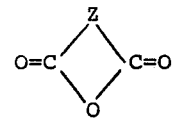

wherein:
    Z has been defined previously, to form the amic acid.

4. A method according to claim 3, wherein Y is hydrogen.

5. A method according to claim 3, wherein Y is said acryl residue.

6. A method according to claim 3, including the additional steps of:
    d. isolating said agarose beads; and
    e. repeatedly washing said agarose beads with an inert substantially anhydrous polar organic solvent, followed by separation of said agarose beads from said solvent, until the water content of said agarose beads is below about 2 weight percent.

7. A method according to claim 6, wherein said organic solvent is at least one of an alkanol of from 1 to 4 carbon atoms or dioxane.

8. A method according to claim 6, including the additional step of:
    f. combining said dehydrated agarose beads in an inert polar solvent with an at least about a stoichiometric amount based on carboxylic acid groups of N-hydroxy succinimide and carbodiimide, to form the ester of N-hydroxy succinimide.

9. Agarose beads of from about 15 to 500 mesh, having exclusion limits of from about 1 to 50 × 10⁶ Daltons and having from about 0.0005 to 0.5 moles of 2-hydroxy-1,3-propylene cross-linking per gram of agarose.

10. Agarose beads according to claim 9, having from about 0.0005 to 1 mole of:

$$—R—N(H)Y$$

groups bound to said agarose through an ether linkage; wherein:
    R is alkylene of from 2 to 6 carbon atoms; and
    Y is hydrogen or is an acyl residue of a dicarboxylic acid capable of forming a cyclic anhydride of from 5 to 6 annular members of the formula:

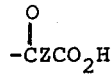

wherein:
    Z is hydrocarbon of from 2 to 8 carbon atoms.

11. Agarose beads according to claim 10, wherein

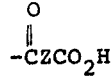

is esterified with N-hydroxy succinimide.

* * * * *